United States Patent
Koichi

(10) Patent No.: US 7,379,786 B2
(45) Date of Patent: May 27, 2008

(54) METHOD AND DEVICE FOR SIMULATING WEARING OF A KNIT GARMENT AND PROGRAM THEREOF

(75) Inventor: Terai Koichi, Wakayama (JP)

(73) Assignee: Shima Seiki Manufacturing, Ltd., Wakayama (JP)

( * ) Notice: Subject to any disclaimer, the term of this patent is extended or adjusted under 35 U.S.C. 154(b) by 0 days.

(21) Appl. No.: 10/589,943

(22) PCT Filed: Feb. 23, 2005

(86) PCT No.: PCT/JP2005/002864

§ 371 (c)(1),
(2), (4) Date: Aug. 18, 2006

(87) PCT Pub. No.: WO2005/082186

PCT Pub. Date: Sep. 9, 2005

(65) Prior Publication Data

US 2007/0173968 A1 Jul. 26, 2007

(30) Foreign Application Priority Data

Feb. 26, 2004 (JP) ............................. 2004-050895

(51) Int. Cl.
*G06F 19/00* (2006.01)
(52) U.S. Cl. ..................................... 700/135
(58) Field of Classification Search ............... 700/130, 700/131, 132, 133, 135, 141
See application file for complete search history.

(56) References Cited

U.S. PATENT DOCUMENTS 6,473,671 B1 * 10/2002 Yan ............................. 700/134
6,546,309 B1 * 4/2003 Gazzuolo .................... 700/132
7,092,982 B2 * 8/2006 Fujiwara et al. ............ 709/200
7,242,999 B2 * 7/2007 Wang .......................... 700/132
2002/0188372 A1 * 12/2002 Lane et al. ................. 700/130
2005/0119779 A1 * 6/2005 Amico et al. ............... 700/132
2007/0173968 A1 * 7/2007 Koichi ........................ 700/141

FOREIGN PATENT DOCUMENTS

| JP | 11-238086 A | 8/1999 |
| JP | 11-296573 A | 10/1999 |
| JP | 2000-3383 A | 1/2000 |
| JP | 2000-331058 A | 11/2000 |
| JP | 2002-117414 A | 4/2002 |
| JP | 2004-252594 A | 9/2004 |
| JP | 2005-11027 A | 1/2005 |
| WO | WO 03/024261 A | 3/2003 |

* cited by examiner

*Primary Examiner*—Danny Worrell
(74) *Attorney, Agent, or Firm*—Rothwell, Figg, Ernst & Manbeck, P.C.

(57) ABSTRACT

A body and sleeves of a designed virtual seamless knit garment are expanded into an elliptic cylindrical shape and tentatively positioned with respect to a human model. Each part of the expanded seamless garment is moved towards each axis of the torso and both arms of the human model and is tentatively worn. The stitch arrangement in the worn garment is smoothed in the horizontal and vertical directions and the stitch positions are roughly corrected. Next, the stitch position of each part of the garment is repeatedly smoothed so as to obtain a virtual garment after wearing. It is possible to perform simulation of the state in which the knit garment is worn by a person, on the basis of a reliable model involving little computational effort.

6 Claims, 14 Drawing Sheets

7,379,786 B2

METHOD AND DEVICE FOR SIMULATING WEARING OF A KNIT GARMENT AND PROGRAM THEREOF

CROSS REFERENCE TO RELATED APPLICATION

This application is a 35 USC § 371 National Phase Entry Application from PCT/JP2005/002864, filed Feb. 23, 2005, and designating the United States.

TECHNICAL FIELD

The present invention relates to virtual wearing, by a human model, of a knit garment such as a seamless tubular-shaped knit garment or the like.

BACKGROUND ART

The Art of Knitted Fabrics, Realistic & Physically Based Modeling of Knitted Patterns, EUROGRAPHICS'98, Vol. 17, (1998), Number 3, discloses a method for three-dimensional simulation of knit garment shapes. To simulate in three dimensions the shape of a garment, the method solves the motion equations of the stitches, in which every stitch of a knit garment is treated as a mass point, with the stitches being connected with springs. This method, however, does not disclose how a garment is worn by a human model.

Japanese Patent Application Laid-open No. H09-273017 proposes simulating stretchable clothing such as a swimsuit or the like by expanding a garment and putting it on a human body to fit thereto.

Japanese Patent Application Laid-open No. H08-44785 proposes simulating the wearing state of clothes by dividing a garment into a plurality of fabrics, and making each fabric collide with a human body.

In order to simulate the wearing state of knit garment some hundreds of thousands of stitches need to be arranged. It is thus necessary to reduce the computational effort required for simulation, and to base the simulation on a specific, well-grounded model.

DISCLOSURE OF THE INVENTION

An object of the present invention is to allow wearing by a human model of a virtual knit garment comprising multiple stitches, with relatively small computational effort, and to allow efficiently searching polygons of a human model that correspond to points of the virtual knit garment, without resorting to a round-robin scheme.

A secondary object in the present invention is to simulate the process by which a person wears a knit garment.

In the invention, a method for simulating wearing of a knit garment on a human model, the human model having a plurality of polygons on a surface of the human model and an axis, the method comprises the steps of:

positioning a virtual knit garment tentatively with respect to the human model in such a way that the axis of the human model passes through an interior of the virtual knit garment;

fitting the tentatively positioned virtual knit garment to the human model by expanding/shrinking the virtual knit garment toward the axis;

associating each point of the virtual knit garment with the polygons of the human model, wherein a perpendicular line from said each point towards the axis is obtained, a polygon intersecting the perpendicular line is obtained, and said each point associates with the polygon; and initiating obtaining a polygon associated with a subsequent point from a polygon associated with a neighboring point which is already obtained.

In the invention, a wearing simulation device comprises:

storing means for storing in 3D an axis of a human model, and a position and an orientation of a plurality of polygons provided on a surface of the human model;

arranging means for tentatively arranging a virtual knit garment in a three-dimensional space, in such a way that said axis passes through an interior of the virtual knit garment; and wearing means for fitting the virtual knit garment to the human model by shrinking/expanding the virtual knit garment toward the axis for each stitch of the virtual knit garment, obtaining a perpendicular line from said each stitch towards a corresponding axis, associating a polygon intersecting the perpendicular line with said each stitch, initiating obtaining a polygon associated with a subsequent stitch from a polygon associated with a neighboring stitch which is already obtained, and associating each point of a part with a polygon intersecting a direction of the shrinking/expanding.

In the invention, a wearing simulation program comprises:

storing command for storing in 3D an axis of a human model, and a position and an orientation of a plurality of polygons provided on a surface of the human model;

arranging command for tentatively arranging a virtual knit garment in a three-dimensional space, in such a way that said axis passes through an interior of the virtual knit garment; and wearing command for fitting the virtual knit garment to the human model by shrinking/expanding the virtual knit garment toward the axis for each stitch of the virtual knit garment, obtaining a perpendicular line from said each stitch towards a corresponding axis, associating a polygon intersecting the perpendicular line with said each stitch, initiating obtaining a polygon associated with a subsequent stitch from a polygon associated with a neighboring stitch which is already obtained, and associating each point of a part with a polygon intersecting a direction of the shrinking/expanding.

In the wearing simulation method, wearing simulation device and wearing simulation program of the present invention, preferably, prior to wearing, the virtual knit garment is three-dimensionally expanded beyond a natural size predicted based on at least number of stitches and stitch size, and subsequently, upon wearing, a stitch outside the human model is shrunk and a stitch inside is expanded.

The present specification deals with knit garments only, and hence the latter may also be referred to simply as garments, omitting "knit", and with virtual garments only, and hence "virtual" may be omitted to speak simply of garment wearing, garment expansion and so forth.

In the present invention, the fit of a knit garment to a human model is simulated by expanding/shrinking parts towards axes of the human model. This allows performing simulation with relatively little computational effort, while based on a specific model.

The knit garment comprises a very large number of stitches, so that representing a human model with polygons requires numerous polygons in order to yield a realistic human model. The stitches must have position and orientation, which can be achieved by mapping the stitches to the polygons. Instead of obtaining a polygon correspondence for each stitch, points of parts representing for instance several stitches each may be generated and mapped to the polygons. The mapping between stitches and polygons must be carried out at high speed. A round-robin scheme, for instance, is not efficient. Polygon search can be made more efficient, therefore, by starting a search from an already searched polygon, i.e. a polygon mapped to an immediately preceding stitch and/or point on the same course, a stitch on the previous course and overlapping in the wale direction, or the like.

Preferably, prior to the tentative positioning of the knit garment, the knit garment is three-dimensionally expanded beyond the natural size thereof, the expanded knit garment being then shrunk towards the human model at the time of wearing. Herein, the stitches inside the human model are expanded towards the surface of the human model. This model imitates the shrinking of a knit garment towards the surface of a human body when the knit garment expands as somebody puts it on. Since no stitch can be present inside a human body, the model mimics the widening of the garment on the human model and expands the stitches inside the human model towards the surface of the human model.

BRIEF DESCRIPTION OF THE SYMBOLS

| | |
|---|---|
| 2 | Wearing simulation device |
| 4 | Garment design unit |
| 6 | Manual input unit |
| 8 | Display unit |
| 10 | Color printer |
| 12 | 3D image storing unit |
| 14 | Data conversion unit |
| 16 | LAN interface |
| 18 | Disk drive |
| 20 | General-purpose memory |
| 22 | Preliminary deformation unit |
| 24 | 3D deformation unit |
| 26 | Wearing unit |
| 28 | Approximate correction unit |
| 30 | Smoothing unit |
| 32 | Rendering unit |
| 40 | Wearing program |
| 42 | Preliminary deformation unit |
| 43 | Boundary detection unit |
| 44 | Region attributing unit |
| 45 | Smoothing unit |
| 46 | Collar deformation unit |
| 50 | 3D deformation unit |
| 52 | Wearing unit |
| 53 | Axis storing unit |
| 54 | Polygon list |
| 55 | Vertex list |
| 56 | Tentative positioning unit |
| 57 | Collision polygon judgment unit |
| 58 | Stitch motion unit |
| 60 | Stitch data storing unit |
| 62 | Stitch data |
| 70 | Approximate correction unit |
| 71 | Horizontal correction unit |
| 72 | Vertical correction unit |
| 80 | Smoothing unit |
| 81 | Four-neighbor correction unit |
| 82 | Shrinking and expansion unit |
| 90 | Rendering unit |
| 91 | Polygon normal direction correction unit |
| 92 | Yarn model processing unit |
| 100 | Neck 100 |
| 102 | Shoulder |
| 104 | Torso surface |
| 106 | Body |
| 110 | Arm surface |
| 112 | Sleeve |
| 114 | Central axis of the sleeve |
| 116 | Sleeve after shrinking |
| 120 | Neck surface |
| 122 | Collar |
| 130 | Expanded tubular garment |
| 132 | Body after wearing |
| 134, 135 | Sleeve after wearing |
| 136, 137 | Split line |
| 140 | Axis |
| 141 to 144 | Polygon |
| 146 | Stitch before being moved |
| 147 | Stitch having collided with polygon |
| 152 | Body after approximate correction in the horizontal direction |
| 154, 155 | Sleeve after approximate correction in the horizontal direction |
| 156 | Line |
| 158a to 158c | Polygon |
| 159 | Stitch to be judged |
| 160a | Immediately preceding stitch on the same course |
| 160b | Stitch of one preceding course on the same wale |
| 160c | Stitch of one preceding course on the next wale |
| 160d | Stitch of one preceding course on the second to next wale |
| 161 | Stitch having not been judged yet |
| 162 | Body after approximate correction in the vertical direction |
| 164, 165 | Sleeve after approximate correction in the vertical direction |
| 168 | Approximate correction per wale in the vertical direction |
| 170 | Own stitch |
| 171 | Parent stitch |

-continued

| | |
|---|---|
| 172 | Child stitch |
| 173 | Right-hand adjacent stitch |
| 174 | Left-hand adjacent stitch |
| 176 | Position relative to four neighboring stitches after smoothing |
| B, C, D | Point at collar |
| B', C' | Point after moving |
| b | Axis of torso |
| ra | Axis of right arm |
| la | Axis of left arm |

BEST MODE FOR CARRYING OUT THE INVENTION

Preferred embodiments for carrying out the invention are explained next.

EXAMPLES

Figure 1:
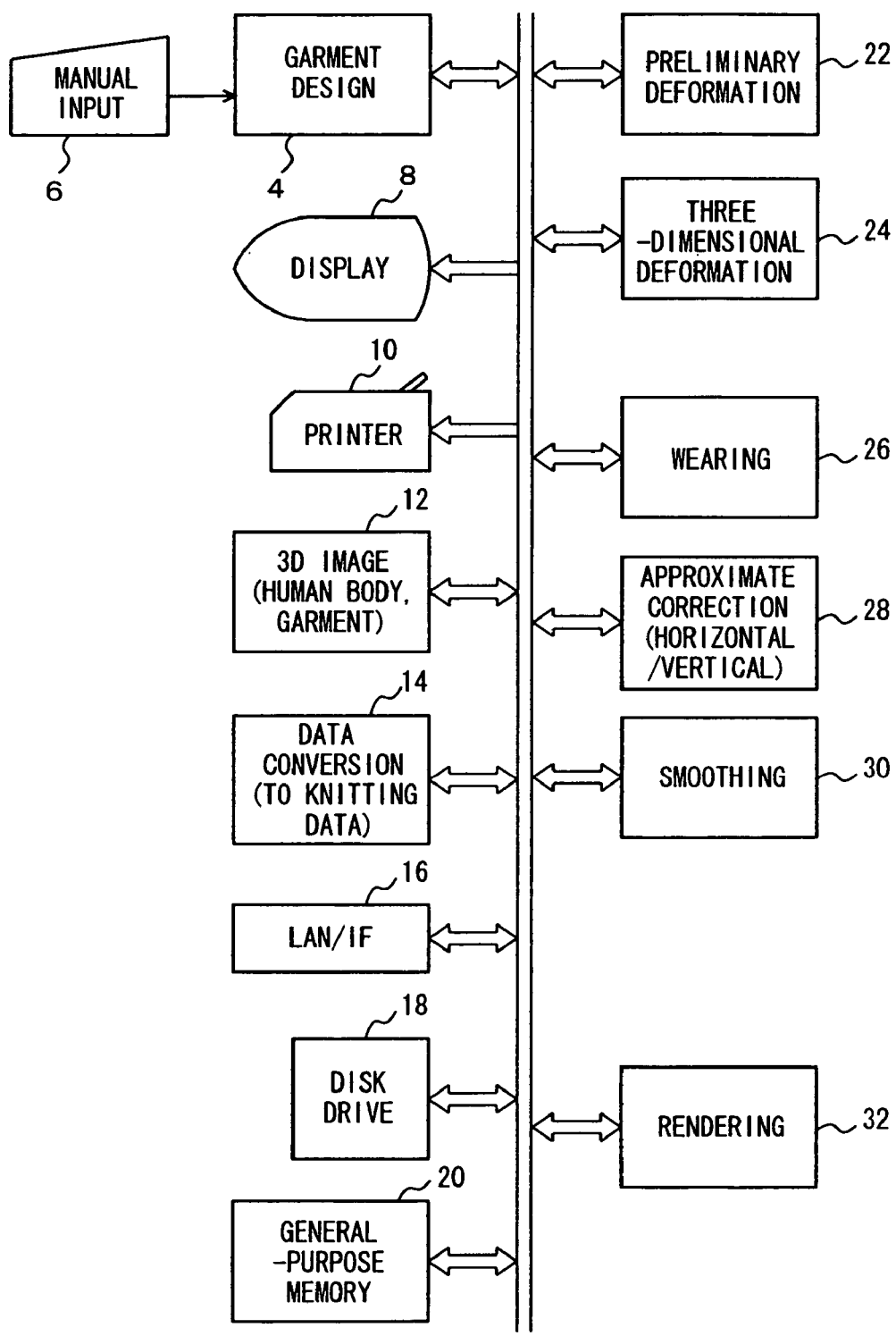
FIG. 1 is a block diagram of a wearing simulation device in an example.

An example is illustrated in FIGS. 1 to 19. FIG. 1 illustrates a wearing simulation device 2, in which a knit design device, a 3D image processing device and the like have been omitted, as they are routinely provided in such a simulation device. The numeral 4 denotes a garment design unit for designing a knit garment based on inputs through a manual input unit 6, a LAN interface 16, a disk drive 18 or the like. The knit garment to be designed may be for instance a seamless tubular garment or a sewn garment; in order to design a knit garment in the latter case, the garment design unit 4 comprises information on how the different garment parts are sewn. A display unit 8 displays various images, functioning also as a graphic user interface, and displays images of the design process by the garment design unit 4, and/or images of a garment after wearing by a human model. These images are printed in a color printer 10.

A 3D image storing unit 12 stores images of a human model and 3D images of a designed knit garment. As the human model may be used, for instance, a mannequin, a model of an actual person, or the like. The human model is an aggregate of several tens of thousands of polygons, and comprises at least three axes corresponding to the torso and both arms. The polygons are preferably divided into about 10 to 20 groups. A data conversion unit 14 converts garment design data created in the garment design unit 4 into knitting data; herein, the data for wearing simulation may be knitting data after data conversion or design data prior to conversion. A LAN interface 16 connects the wearing simulation device 2 to a LAN, a disk drive 18 drives an arbitrary disk, and a general-purpose memory 20 stores various data.

In a preliminary deformation unit 22, the data of a designed garment is deformed to a natural state. A natural state herein refers, for instance, to a state in which the garment is laying statically on a flat surface, or a state in which the garment hangs statically within a vertical plane, with the weight of the garment supported by the line of the shoulders.

The subject matter in the present specification relates not to an actual garment but to design data thereof. Accordingly, images representing design data, virtual garments simulated based on such design data and the like, will be called simply garments.

In the present specification, moreover, the simulation device, the simulation method and the simulation program all belong to a single concept. Hence, the description relating to the simulation device 2 applies as well to the simulation method and/or the simulation program, and conversely, the description relating to the simulation method and/or the simulation program apply also to the simulation device 2.

Figure 3:
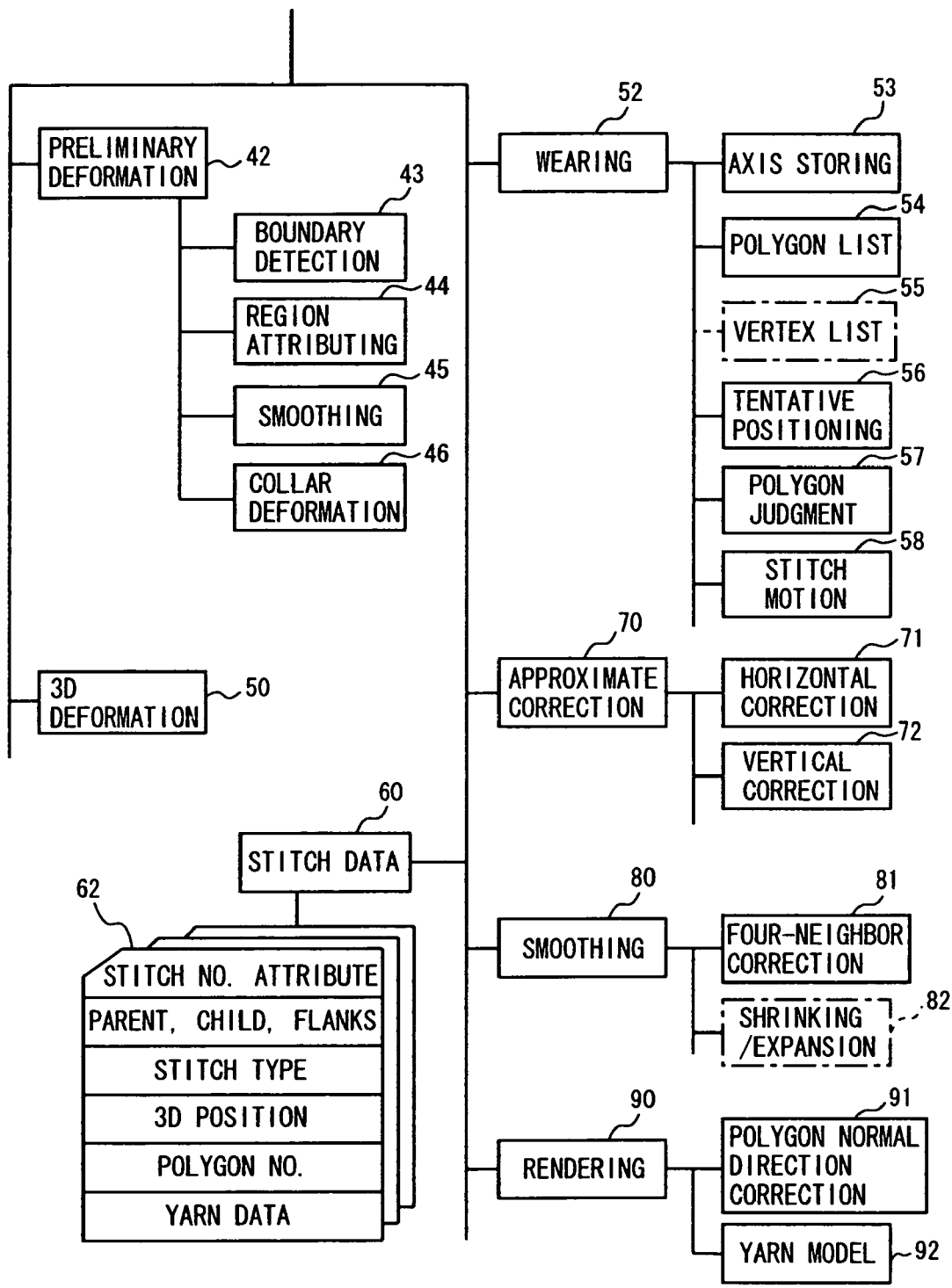
FIG. 3 is a block diagram of a wearing simulation program in the example.
Figure 4:
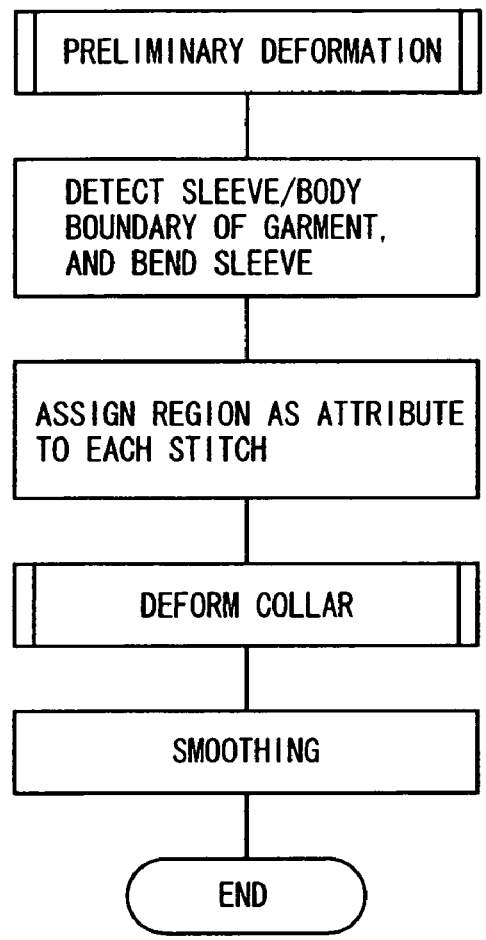
FIG. 4 is a flowchart illustrating a preliminary deformation algorithm in the example.

For instance, the collar of a garment is deformed by the preliminary deformation unit 22, as explained in the wearing program 40 of FIG. 3 and the preliminary deformation of FIG. 4. These explanations apply also to the preliminary deformation unit 22 of FIG. 1; the functions necessary in FIG. 3, FIG. 4 and so on are also comprised in the preliminary deformation unit 22 of FIG. 1. This applies to other parts of the wearing simulation device 2.

A 3D deformation unit 24 expands into respective elliptic cylindrical shapes, for instance, a garment comprising three tubes of a body and two sleeves. In addition, the garment is drawn out vertically in accordance with garment stretching in the vertical direction as a result of the weight of the garment. The wearing unit 26 positions tentatively the garment with respect to a human model, for instance shrinks/expands three or more garment parts such as a body and both sleeves relative for instance to three axes of the torso and both arms, to obtain a hypothetical wearing of a garment by a human model.

The garment is strained when worn. In the joining portions of the sleeves and the body, for instance, the body moves towards the axis of the torso and the sleeves move towards the axes of the arms, which results in a larger distance between neighboring stitches. Therefore, an approximate correction unit 28 corrects approximately the stitch arrangement in two directions, a horizontal direction (course direction) and a vertical direction (wale direction). In horizontal-direction correction, for instance, the stitches are corrected so as to become evenly arranged in the course direction, or are corrected so that each stitch becomes arranged at a stitch central point on both sides of the course direction. The wale direction loses its straight-line shape on account of the contour of the human body surface, the junctions of the body with the sleeves, and other factors; for this reason, the offset of the wale direction from the vertical is additionally corrected by means of approximate correction in the vertical direction. For example, the position of each stitch is corrected to an averaged position of the previous and next wale, on the same wale. In a vertical and horizontal approximate correction, the range of stitch motion is constrained so that the stitches do not collide against the polygons.

A smoothing unit 30 smoothes the stitch arrangement of the garment after approximate correction. For instance, when a stitch is adjacent to four stitches, up, down, left and right, each stitch is moved to an averaged position of the surrounding upper, lower, right and left stitches. There are ordinarily four adjacent stitches, although the number of stitches up, down, left and right may be five in case of a stitch being formed on an overlap of two lower stitches, or may be three stitches, up, down left, or up down right stitches at the edges of the knitted fabric, or the like. Preferably, smoothing is carried out repeatedly until the stitch arrangement is stabilized and changes no more. The size of the garment may be corrected, for example, simultaneously with smoothing in order to, among other effects, portray the garment clinging to the human model, or portray a large-shape garment with slack between the garment and the human model. In a rendering unit 32 the precision of a simulated image is enhanced by assigning a yarn model to each stitch of the garment after smoothing, and by slightly sliding the stitches in a direction perpendicular to the polygons, in accordance with the type of the stitch, such as a face stitch, a back stitch or the like.

Figure 2:
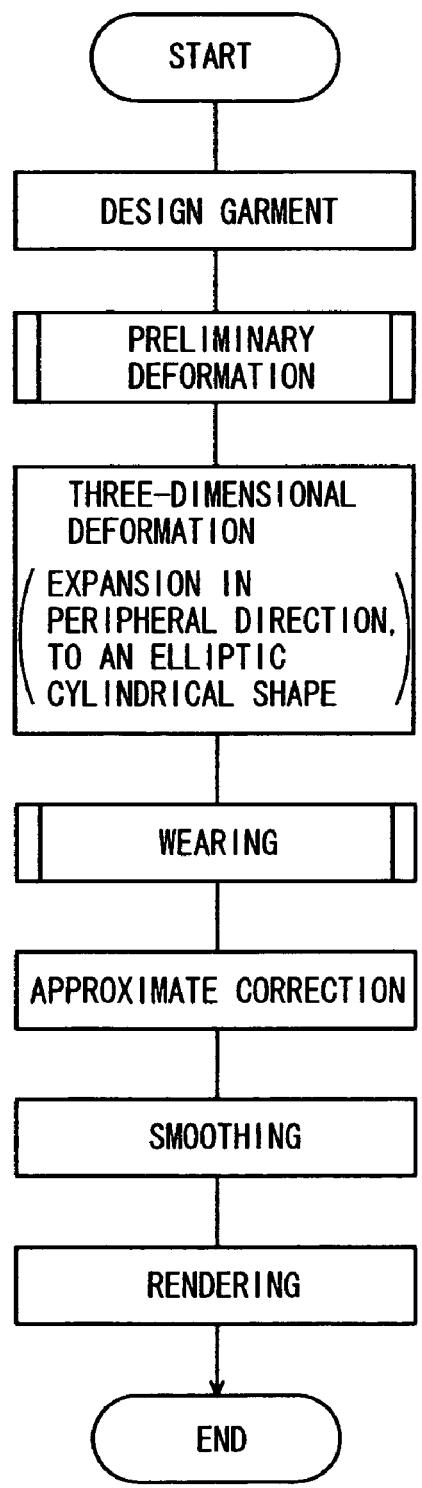
FIG. 2 is a flowchart illustrating schematically a wearing simulation method in the example.

FIG. 2 illustrates schematically a wearing simulation method; herein a seamless garment or the like is designed in a garment design unit 4, then the garment is deformed in the preliminary deformation unit 22 to yield an even, natural garment image. In three-dimensional deformation, the 3D deformation unit 24 expands each part of the garment to an elliptic cylindrical shape. The garment is expanded herein to increase the length (peripheral length) of the garment along the peripheral direction thereof (course direction). An elliptical shape or the like is set arbitrarily to afford an easier fit to the human model. The shape may also be that of a perfect circle, a limiting case of an ellipse. The garment has at least three parts, body and both sleeves, although these parts may each be further divided into numerous parts, for instance by adding a hem rib, a collar, shoulders, pockets, a front placket and the like.

In wearing processing, a human model is made to tentatively wear the garment expanded to an elliptic cylindrical shape through three-dimensional deformation, the strain of the stitch arrangement generated upon wearing is eliminated by approximate correction, and then the stitch arrangement is further smoothed through smoothing processing. Thereafter, the image is imparted visual appeal through rendering, which yields an image suitable for output in the display unit 8 and/or the printer 10. Smoothing and rendering may be carried out simultaneously.

FIG. 3 illustrates schematically a wearing program 40 from which have been omitted programs necessary for garment design and ordinary programs required for 3D image processing. The numeral 42 denotes a preliminary deformation unit; herein, the boundaries of each portion of the garment are detected using a boundary detection unit 43, and based on these boundaries, the garment is divided into various parts such as body, right sleeve, left sleeve, back collar, front collar, hem rubber and the like, and a region attributing unit 44 that assigns to each stitch of the garment a region (part name) of the stitch, as an attribute. Each stitch is thus mapped to a region (part).

The design data of the garment is smoothed into a natural form in a smoothing unit 45. The stitches are thereby imparted a natural size, and the forms of the parts are made into natural forms by, among other procedures, tilting both sleeves towards the body. In a collar deformation unit 46, the collar is deformed so that the front collar is folds down (laid down) while the back collar swings into the front collar side. Collar deformation is explained in FIG. 5 and FIG. 6.

In the 3D deformation unit 50, the garment is virtually expanded into an elliptic cylindrical shape. In the wearing unit 52, the positions of the axes of the human model are stored in an axis storing unit 53. In a polygon list 54 is stored a list of the polygons of the surface of the human model. The number of polygons is for instance of several tens of thousands, such that each polygon has for instance a triangular or quadrangular shape, and the data for each polygon includes, for instance, a polygon number, 3D coordinates of each vertex, and a normal vector. The polygons are classed into the various parts of the human model, such as right arm, left arm, neck and the like. In a simulation of a sweater, for instance, the polygons are preferably grouped into about 10 to 20 types. If the relationship between adjacent polygons is to be distinctly apprehended, there may also be provided a vertex list 55 in which is stored, among others, a list of the polygon numbers that share a given polygon vertex.

Before the garment is fitted to the human model, the portions of the garment are tentatively positioned relative to the human model by a tentative positioning unit 56. At this time the garment still has the expanded shape by the 3D deformation unit 50. The collision polygon judgment unit 57 associates a polygon with each stitch. When the stitches are outside the human model, a foot of a perpendicular line relative to the part to which a stitch belongs is drawn from each stitch, a collision polygon being determined by this perpendicular line. When the stitches are inside the human model, a perpendicular from the stitch to the axis is inversely extended to determine the collision polygon. There are often more than 100,000 stitches, even in sweaters or the like, and hence grouping the polygons makes the determination of the collision polygons more efficient, by narrowing down the number of collidable polygons to about $\frac{1}{10}$ to $\frac{1}{20}$ and avoiding use of a round-robin scheme as much as possible in the determination of which polygons the stitches collide with.

In a stitch motion unit 58, each stitch is moved toward the polygon determined by the collision polygon judgment unit 57 so that each stitch collides with a polygon and rebounds slightly to end up at a position in the original direction or another direction, or outside the polygon, so as to obtain the state of the garment virtually fitted to the human model. The garment has a natural size determined on the basis of number of stitches per course, size of each stitch, and the like. A garment expanded through stretching of the peripheral length is bound to shrink until the peripheral length returns to its natural size. Therefore, the stitches are moved while monitoring the number of stitches per length, and shrinking is stopped when the stitch collides against a polygon. Shrinking is stopped also when the number of stitches per length in the course direction reaches a predetermined value, even if the stitch does not collide against a polygon.

In the processing up to wearing, the garment acquires a relatively natural shape through preliminary deformation and is expanded through three-dimensional deformation, while during wearing, the garment is shrunk to a natural size to fit to the human model. Wearing, thus, attempts to model the process by which a knit garment shrinks from the somewhat expanded state that it acquires when put on by a person, on account of the torso, arms and the like, to a state in which the knit garment fits against the human body.

A stitch data storing unit 60 explains how the stitch data are to be handled by these processes. The stitches are imparted attributes such as a stitch number and a relevant part name, and the numbers of the neighboring stitches such as parent stitch, a child stitch, the two flanking stitches and the like are stored in the stitch data. A parent is for instance a stitch (stitch one course ahead) holding an own sinker loop, and a child is for instance a stitch one course below.

For each stitch is stored also the type of stitch, such as front stitch/back stitch, presence or absence of racking, and the like. By moving up close to the surface of the polygon, the stitch is imparted three-dimensional coordinates (3D position). Herein, the plane containing the stitch loop is parallel to the surface of the polygon while the normal vector of the polygon defines a direction at right angles with the stitch. Since the stitches are mapped to the polygons, the polygon number to which each stitch belongs is stored; for instance, about 1 to 10 stitches correspond on average to one polygon. Data of base material yarn is stored for each stitch or for each stitch cluster. The details of the yarn data are given by a yarn model.

An approximate correction unit 70 has a horizontal correction unit 71 and a vertical correction unit 72. Approximate correction is carried out over one to several times for the horizontal direction and for the vertical direction. A smoothing unit 80 is provided with for instance a four-neighbor correction unit 81, for smoothing the position of each stitch using the four neighboring stitches thereof, i.e. parent, child (upper, lower) and left and right stitches. The movement of the stitches towards the axes may be terminated leaving a peripheral length of each course of the garment longer than the natural peripheral length of the course, after which the garment may be further shrunk. In such cases, a shrinking and expansion unit 82 is provided for shrinking or expanding the garment in such a way that, after approximate correction, the size of each stitch is a real one.

The garment is rendered in a rendering unit 90, after smoothing or concurrently with smoothing. Firstly, the position of each stitch in the normal direction of the polygon is corrected in accordance with the type of stitch, such as face stitch, back stitch or the like, in a polygon normal direction correction unit 91. The position in the normal direction of the polygon is defined as 0 on the polygon surface and "+" outside the human model. In the case of a ribbed knitted fabric, for instance, face stitches are at higher positions relative to the polygons than back stitches. The 3D shape of the garment is corrected thus depending on the knit texture. A yarn model processing unit 92 imparts a yarn model to each stitch. For instance, if every yarn is considered to comprise two parts, core and fluff, the 3D image of each stitch comprises a core and fluff, plus specific hue, bulkiness and the like. The simulation of the garment can proceed subsequently with the application of suitable shading to elicit three-dimensional and shade effects.

Figure 5:
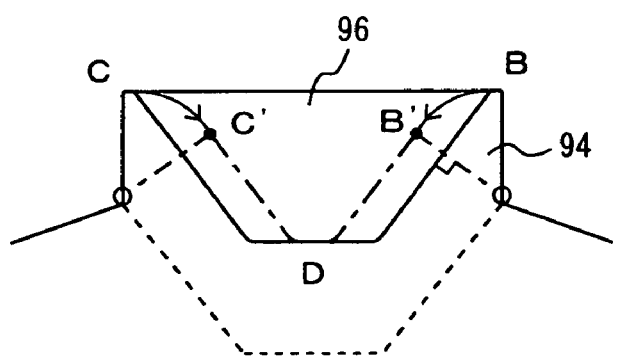
FIG. 5 is a diagram illustrating schematically collar deformation in the example.
Figure 6:
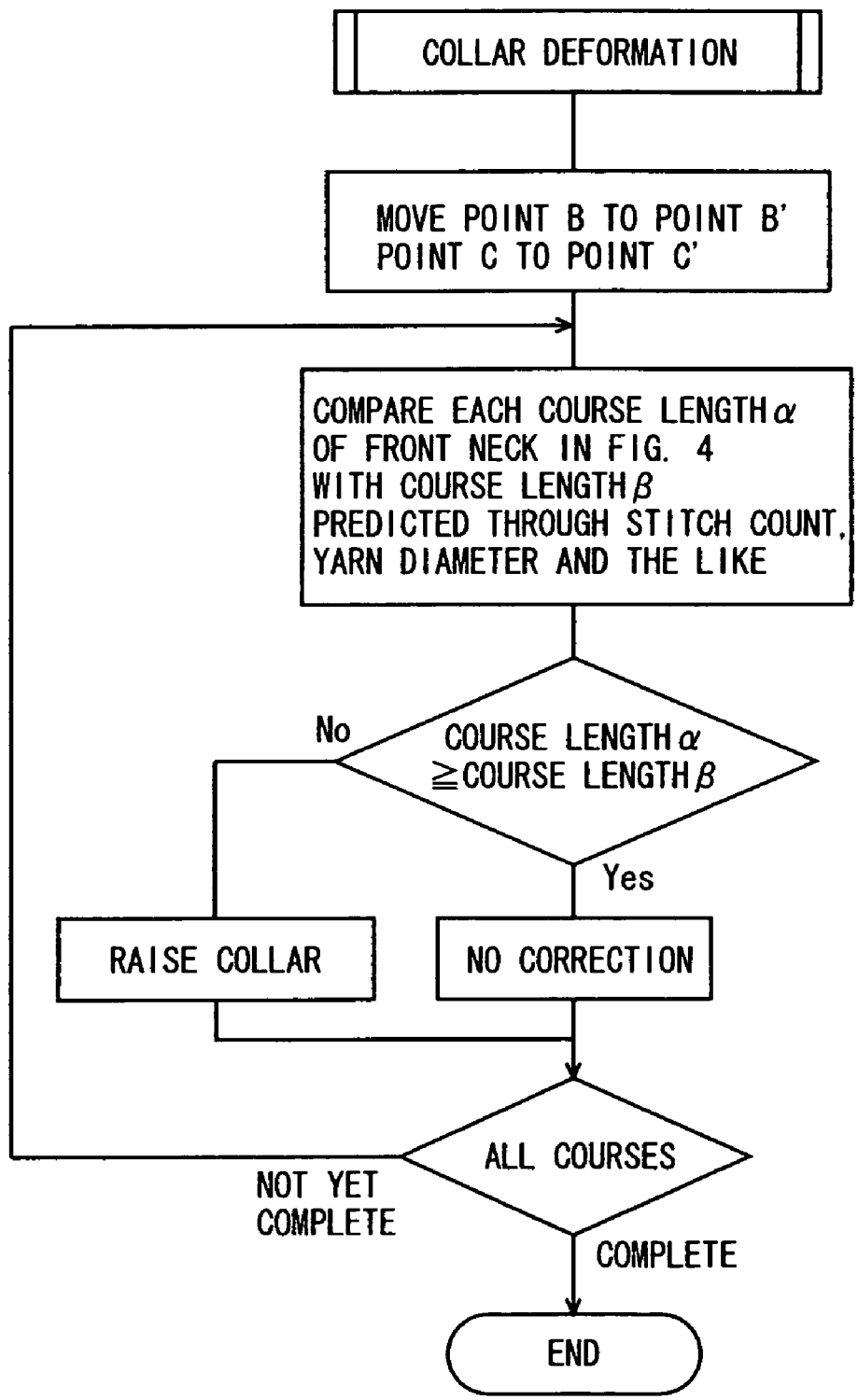
FIG. 6 is a flowchart illustrating a collar deformation algorithm in the example.

FIG. 4 illustrates a preliminary deformation algorithm in which boundaries between the parts of the garment such as sleeves, body and the like are detected and then, in accordance with the detection results, the sleeves and body are deformed naturally through bending or the like. Detection of the boundaries among parts allows imparting a region attribute to each stitch. In addition, as illustrated in FIG. 5 and FIG. 6, the collar is deformed. In FIG. 5, the numeral 94 denotes a front collar and the numeral 96 a back collar, such that the points B, C at both ends of the front collar 94 are swung around the root on the collar towards a direction perpendicular to the collar drop line of the front collar. As a result, the points B, C move over to B', C'. The back collar 96 deforms when the front collar 94 is pushed down.

A collar deformation algorithm affords a natural collar shape by raising the front collar 94 in case that the latter is pushed too far down initially. Once the points B and C are moved to B' and C', respectively, a course length $\alpha$ in the pushed-down condition illustrated in FIG. 5 is compared with a course length $\beta$ predicted on the basis of the number of stitches of each course and on the yarn diameter, for each course from the lower side to the upper side of the front collar 94. When the course length $\alpha$ is smaller than the course length $\beta$, the collar has been pushed too far down, and the collar is lifted by, for instance, raising a next course so as to overlap with a previous course in the vertical direction. When the course length $\alpha$ is greater than the course length $\beta$, the collar is considered to be folded down naturally, as illustrated in FIG. 5, and no course correction is performed. As this processing is carried out for all the courses of the collar, the front collar 94 becomes folded down, as illustrated in FIG. 5, which allows the back collar 96 to swing inwards. Thereafter, the stitch arrangement of the garment is smoothed so as to bring the stitches to an averaged position of the respective four stitches, up, down, left and right, adjacent to each stitch.

Figure 7:
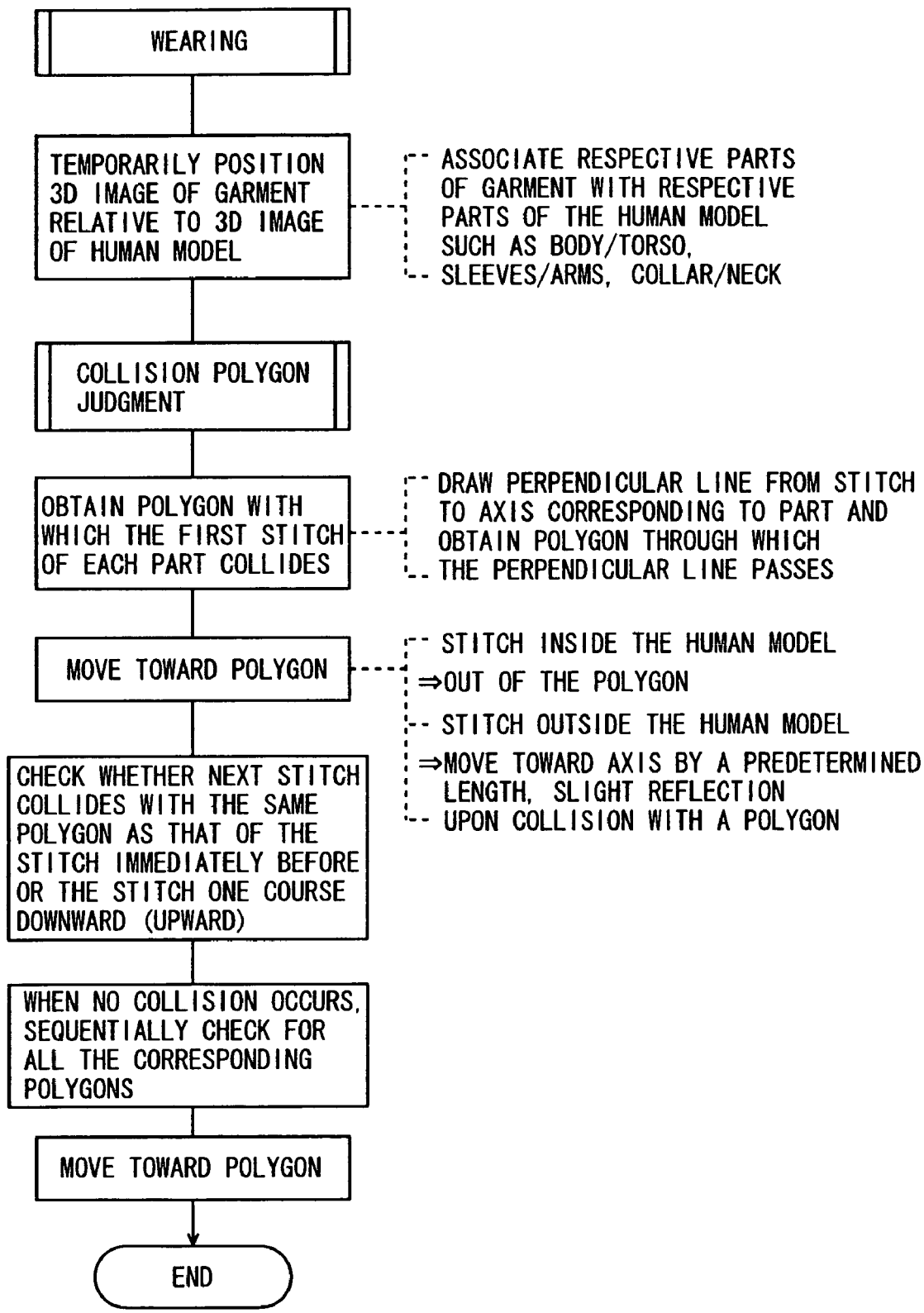
FIG. 7 is a flowchart illustrating a wearing algorithm in the example.
Figure 8:
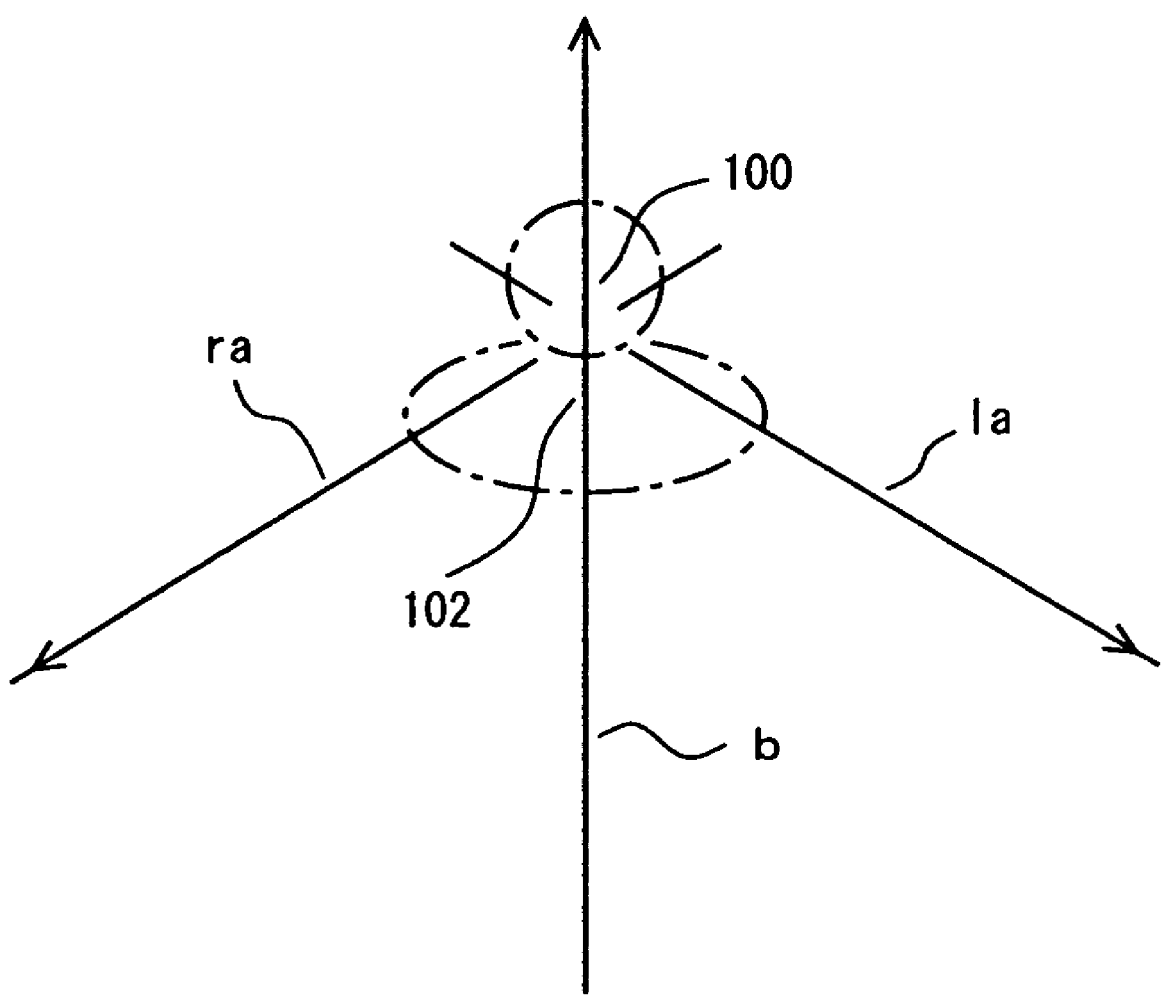
FIG. 8 is a diagram illustrating schematically the axes of a torso and both arms in a human model used in the example.
Figure 9:
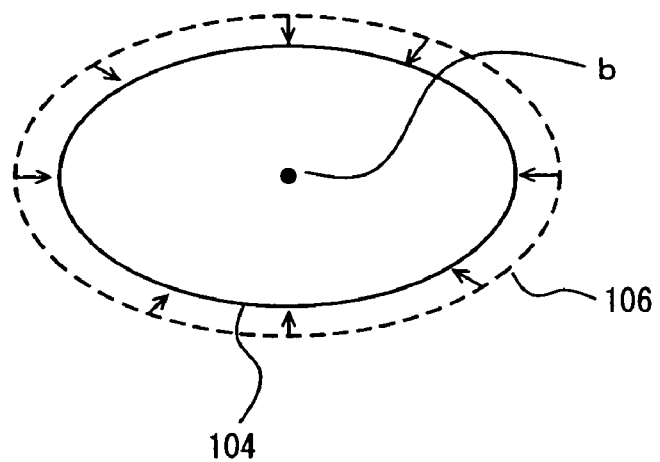
FIG. 9 is a diagram illustrating schematically a plan view of wearing in the example through peripheral-direction shrinking of a body towards the torso.

FIG. 7 to FIG. 12 explain the process of virtually fitting the garment to the human model. As illustrated in FIG. 8, the human model has at least three axes, for instance a torso b, a left arm ra and a left arm la. The axes may be straight or curved. The intersection of the three axes corresponds to a neck 100 and to a shoulder 102 below the neck 100. In FIG. 9, the numeral 104 denotes a torso surface, viewed from above. This surface is actually composed of numerous polygons. A body 106, expanded by means of three-dimensional deformation and having an elliptic cylindrical shape, is arranged so as to surround the torso surface 104; herein, the tentative positioning unit 56 arranges tentatively the body 106 at a substantially appropriate position relative to the torso. Each stitch of the body 106 is shrunk towards the axis b of the torso, the shrinking being stopped when the stitch collides against a polygon or upon reaching a predetermined number of stitches per length. When part of the stitches of the body are inside the polygons on account of the contour of the torso surface, such stitches are moved out of the polygons in a direction bearing away from the axis, the expansion being stopped upon reaching a predetermined number of stitches per length.

Figure 10:
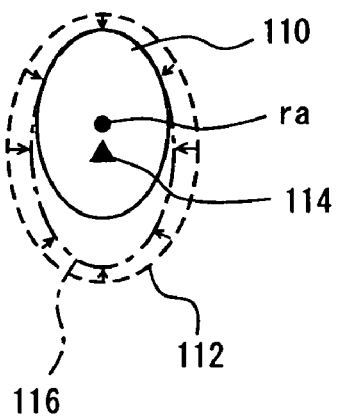
FIG. 10 is a diagram illustrating schematically a vertical view of wearing in the example through peripheral-direction shrinking of a sleeve towards an arm.
Figure 11:
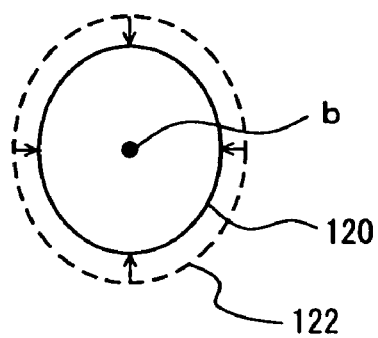
FIG. 11 is a diagram illustrating schematically a plan view of wearing in the example through peripheral-direction shrinking of a collar towards a neck.

The numeral 110 in FIG. 10 denotes an arm surface and the numeral 112 denotes a sleeve; herein, a central axis of the sleeve 114 is located for instance somewhat below an arm axis such as the axis ra of the right arm. When the sleeve 112 is shrunk as indicated by the arrows in FIG. 10, the sleeve 116 after shrinking adopts a shape such that the upper portion of the sleeve 116 after shrinking fits substantially against the upper portion of the arm, leaving a gap between the lower portion of the sleeve and the arm. Performing shrinking with the center axis of the sleeve 114 arranged somewhat below the axis of the arm causes the upper portion of the sleeve to come into contact with the arm leaving the lower portion of the sleeve to droop with a natural shape. In addition, the shrinking speed up and down the sleeves in the vertical direction may be changed, and the shrinking speed upwards from the lower side of the sleeve may also be reduced. In that case, the axis 114 need only be arranged at a position identical to that of the axis ra and the like. In FIG. 11, the numeral 120 denotes a neck surface, through the center whereof passes for instance the axis b of the torso. As was the case for the body, a collar 122 is shrunk in the direction of the arrows of FIG. 11.

Figure 12:
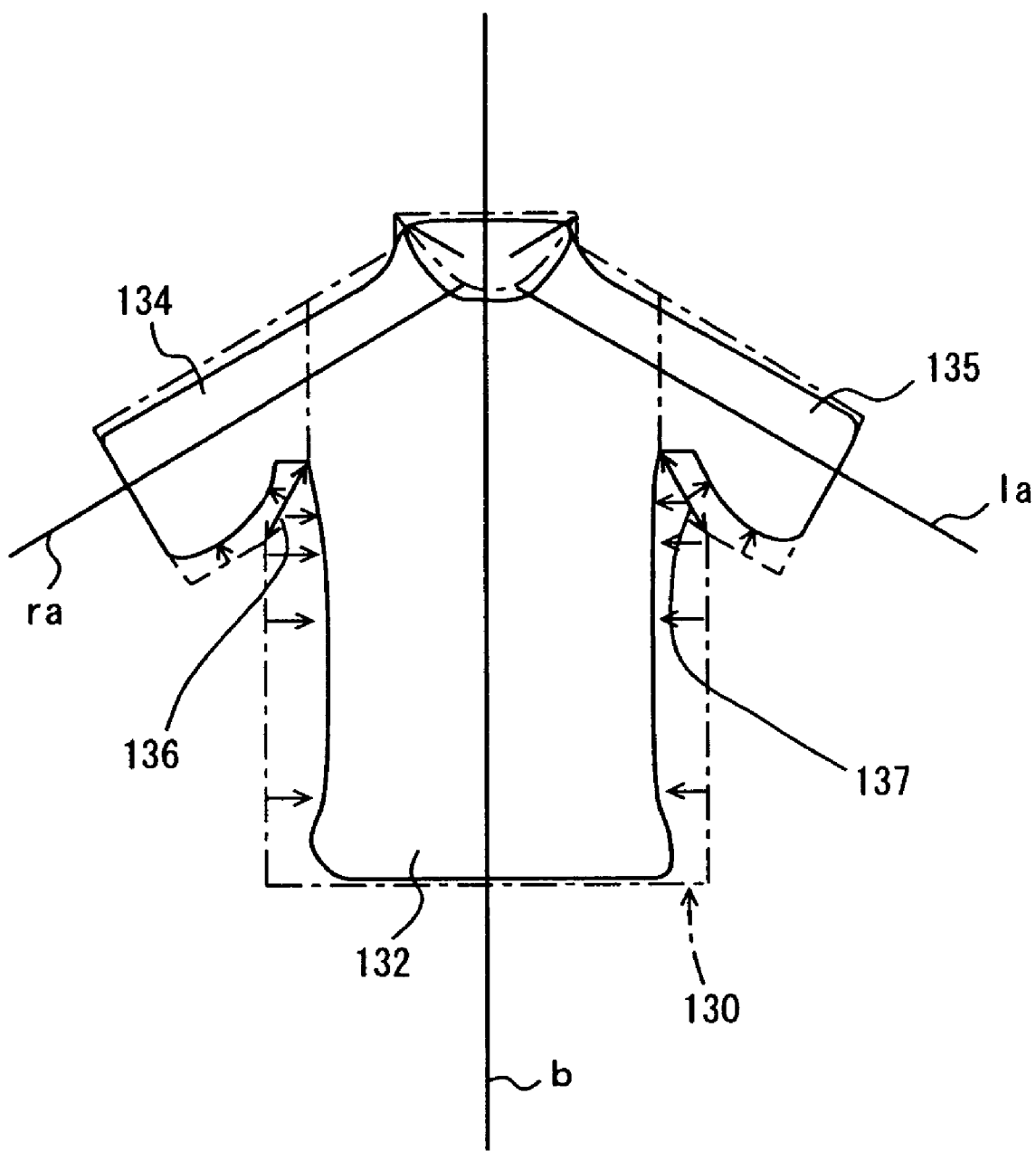
FIG. 12 is a diagram illustrating schematically a vertical view of a knit garment after wearing in the example.

FIG. 12 illustrates a tentatively worn garment; in the figure, the numeral 130 denotes an expanded tubular garment not yet put on. Starting from that situation, wearing of the garment in accordance to FIG. 7 through FIG. 11 yields a body 132 after wearing, and sleeves 134, 135 after wearing. In the portions of the split lines 136, 137, the stitches of the body before wearing are adjacent to the stitches of the sleeves before wearing. The stitches of the body, however, shrink in the horizontal direction of FIG. 12, while the stitches of the sleeves shrink in an oblique upward direction of FIG. 12, which gives rise to large gaps between adjacent stitches at the portions of the split lines 136, 137. The various parts of the garment, thus, expand/shrink towards their respective axes creating strain, among other portions, at the boundaries between parts.

Figure 13:
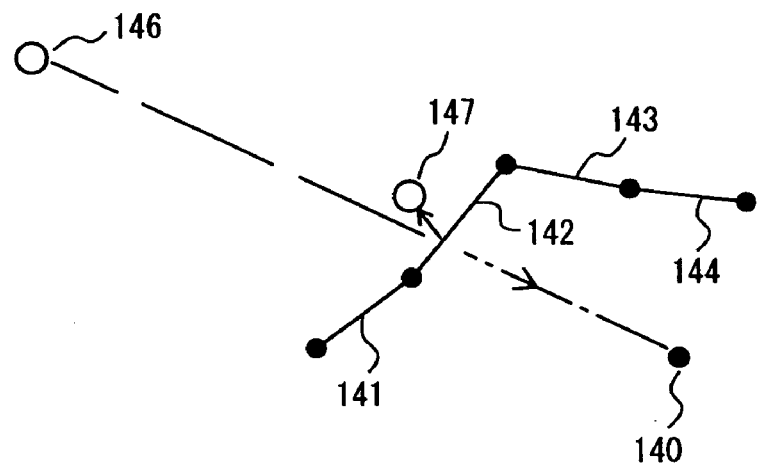
FIG. 13 is a diagram illustrating schematically a stitch moving towards a polygon in the example.

FIG. 13 illustrates collision polygon judgment for each stitch. The numeral 140 denotes an axis corresponding to a part, the numerals 141 to 144 denote polygons, the edges of the boundaries between polygons being depicted as black circles. A stitch 146 before being moved is displaced along a direction perpendicular to an axis 140, a polygon 142 through which this perpendicular line passes becoming herein a collision polygon. The displacement of the stitch 146 is limited in that shrinking does not proceed to a peripheral length smaller than the natural peripheral length of the course; within such a limitation, when the stitch 146 collides against the polygon 142, it rebounds slightly, for instance towards the direction of the stitch before moving, or another direction, and moves to a position of a stitch 147 having collided with the polygon. Even when several tens of thousands of polygons are divided into about 10 to 20 groups, the number of polygons per part is of the order of 1000 or more, which makes it inefficient to use a round-robin scheme for detecting which polygon will be collided against. In the algorithm of FIG. 7, therefore, the collision polygons are judged, for an initial polygon of each part, through a round-robin scheme or the like, or through an appropriate search rule. For subsequent stitches, the polygon against which collides an immediately preceding stitch, or a stitch 1 course downward or 1 course upward, is studied initially as a collision polygon candidate. If the stitch does not collide against any such candidate, the search range is extended to other polygons. This way the judgment of collision polygons becomes more efficient.

Figure 14:
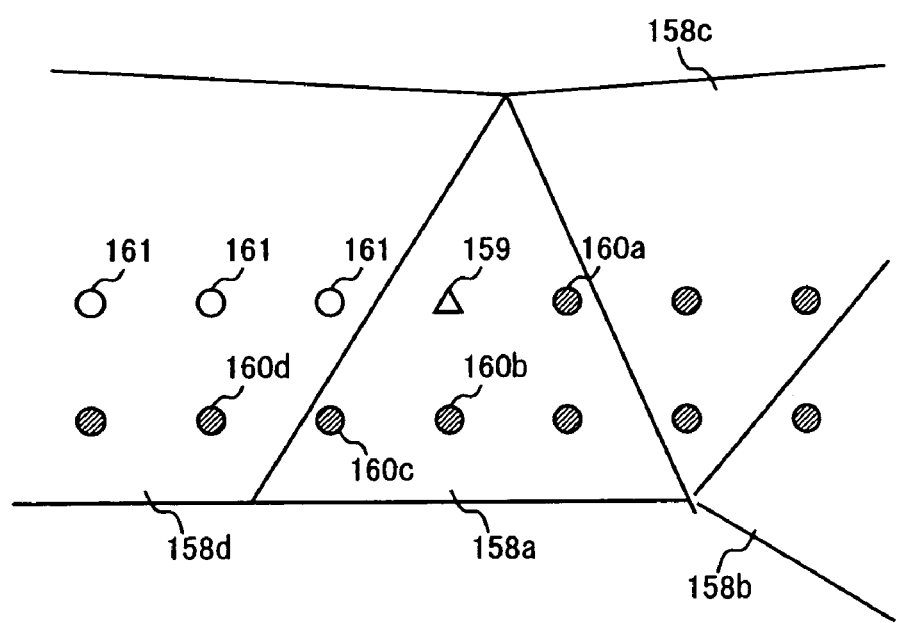
FIG. 14 is a diagram illustrating schematically collision polygon judgment in the example.

FIG. 14 illustrates an example of polygon judgment. In the figure, the numerals 158a to 158d denote polygons, and the knitting courses run from right to left, with a constant course direction in a go-round tubular knitting. The black-circle stitches have already been judged as to which polygon they collide against, the white-circle stitches have not been judged yet, and the search is on now for the polygon against which a stitch 159 collides. The polygon against which collides an immediately preceding stitch 160a on the same course is selected as an initial candidate, and then it is judged whether the stitch 159 collides against this polygon. If it does not collide, a polygon against which collides a stitch 160b of one preceding course on the same wale is selected as a candidate, and then it is judged in the same way whether the stitch 159 collides against this polygon. If the stitch collides against a polygon different from the polygon against which the stitches 160a, 160b collide, the search may proceed by, for instance, studying remaining polygons using a round-robin scheme following an arbitrary sequence, or by selecting as a candidate, for instance, a polygon against which collides a stitch 160c of one preceding course on the next wale, the polygon against which collides a stitch 160d of one preceding course on the second to next wale. In the judgment of collision polygons, polygons against which neighboring stitches collide are given preference as candidates.

Figure 15:
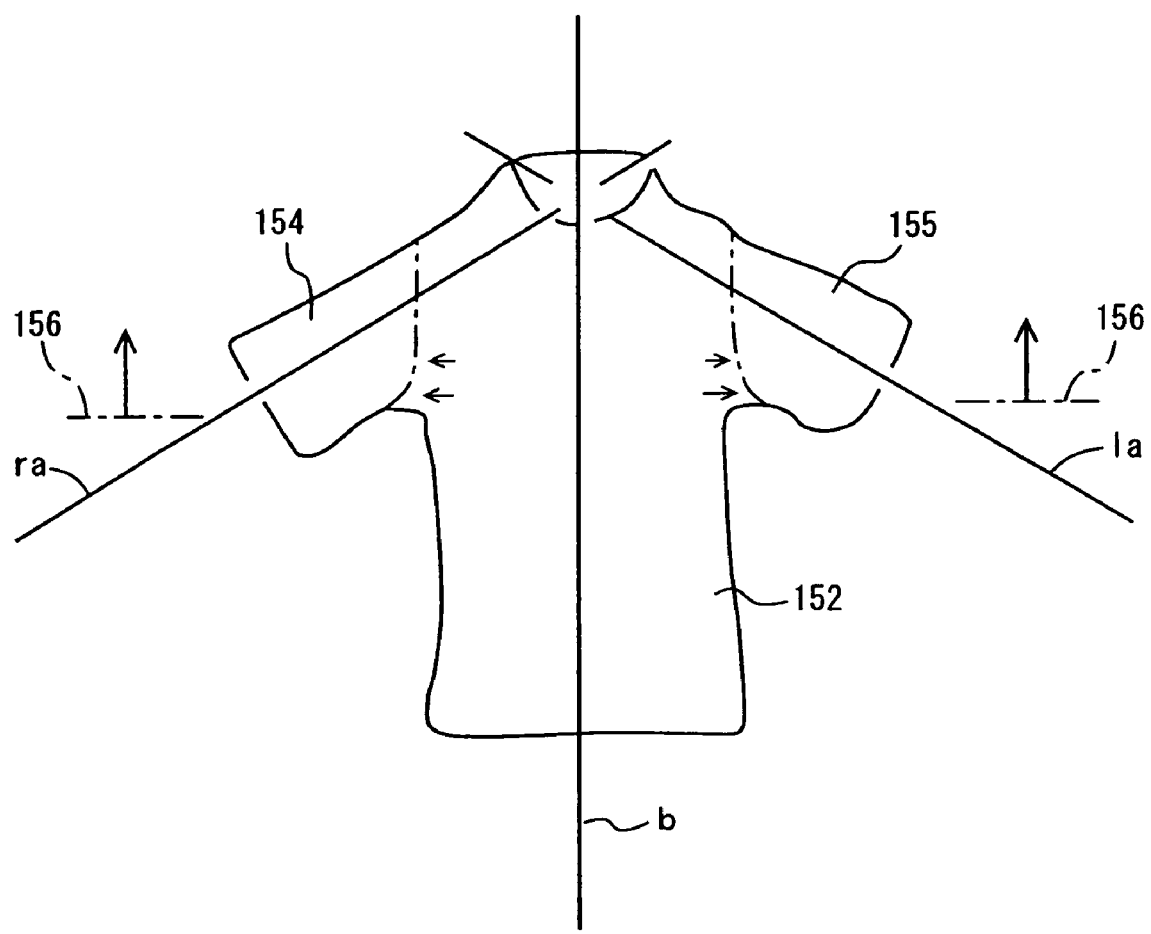
FIG. 15 is a diagram illustrating schematically a garment after horizontal-direction approximate correction in the example.

In FIG. 15, the numeral 152 denotes a body after approximate correction in the horizontal direction, and the numerals 154, 155 denote sleeves after approximate correction in the horizontal direction. In the approximate correction in the horizontal direction, the stitches are rearranged on each course direction of the sleeves and/or body, moving along the course while following rules according to which, for instance, the stitches are arranged equidistantly on each course, or each stitch is rearranged so as to equalize the gap between it and the two stitches adjacent thereto, left and right. As a result, the stitches move in the course direction and the gaps formed between the sleeves and the body are filled so that, for instance, the portions of the split lines 136, 137 of FIG. 12 are filled in by the stitches of the body.

Figure 16:
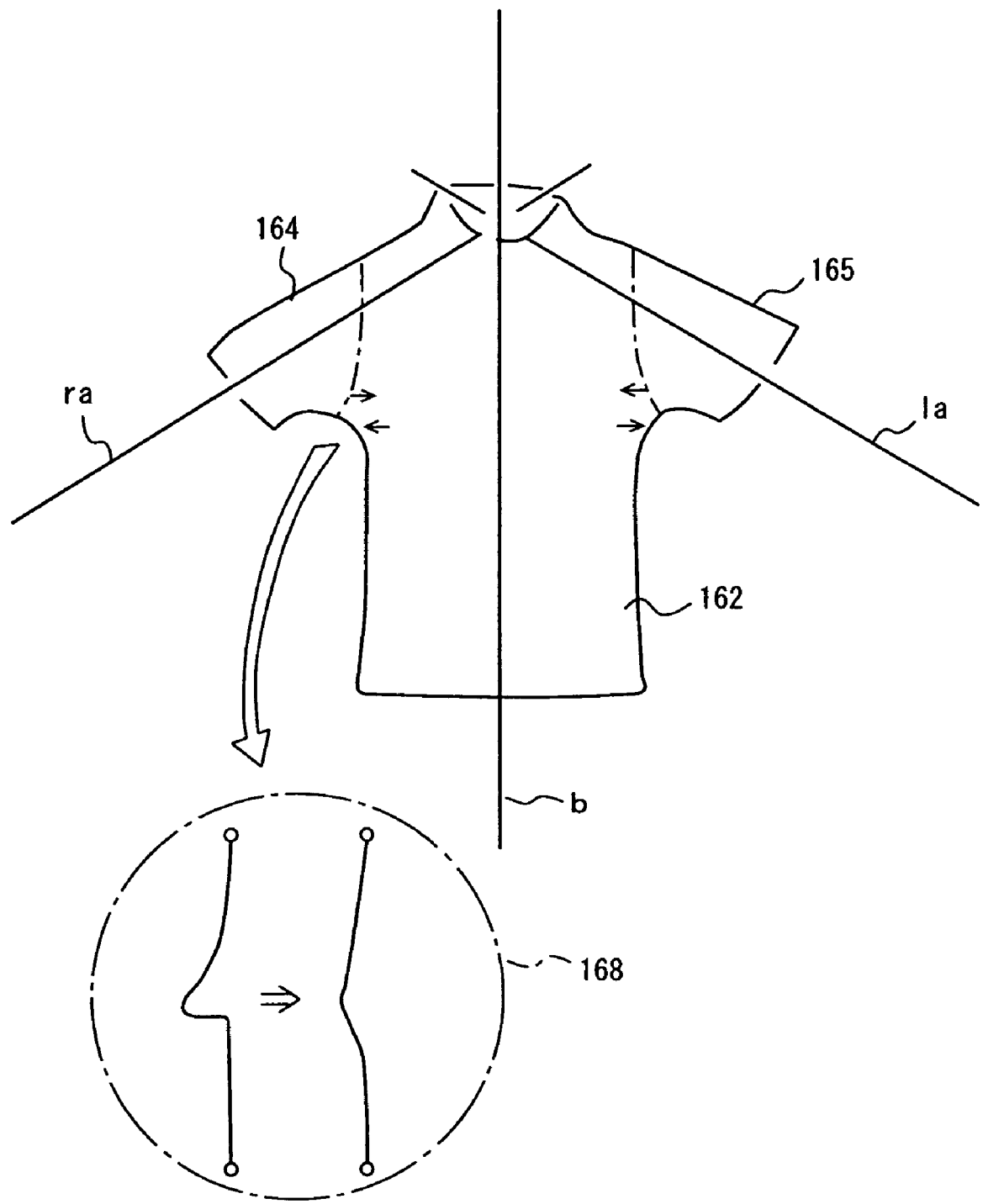
FIG. 16 is a diagram illustrating schematically the garment after vertical-direction approximate correction in the example.

The wale arrangement in the boundary between sleeves and body in FIG. 15 is still unnatural. Thus, approximate correction is carried out additionally along the wale direction (vertical direction), owing to the contour of the human model. In FIG. 16, the numeral 162 denotes the body after approximate correction in the vertical direction, and the numerals 164, 165 denote sleeves after approximate correction in the vertical direction. Approximate correction in the vertical direction is applied to each wale of each part using a model which, for instance, attempts to bring closer a stitch to the middle of two stitches, up and down, in a plumb-vertical direction and a direction within the horizontal plane perpendicular thereto. Herein may be applied a rule such that, for instance, when a stitch collides against a polygon during the correction process, the motion of the stitch is directed to a position where no collision with the stitch occurs, or a rule whereby, for instance, the stitch cannot move. These rules are the same for the approximate correction in the horizontal direction. In FIG. 16, the numeral 168 illustrates approximate correction per wale in the vertical direction. In the figure is depicted one wale of the body in the vicinity of the joining portion with a sleeve. Approximate correction is applied thus also to the vertical direction. In the example, the approximate correction in the horizontal direction and the vertical direction are each performed once, but they may be repeated any number of times, as the case may require, in order to remove the strain caused by wearing.

Figure 17:
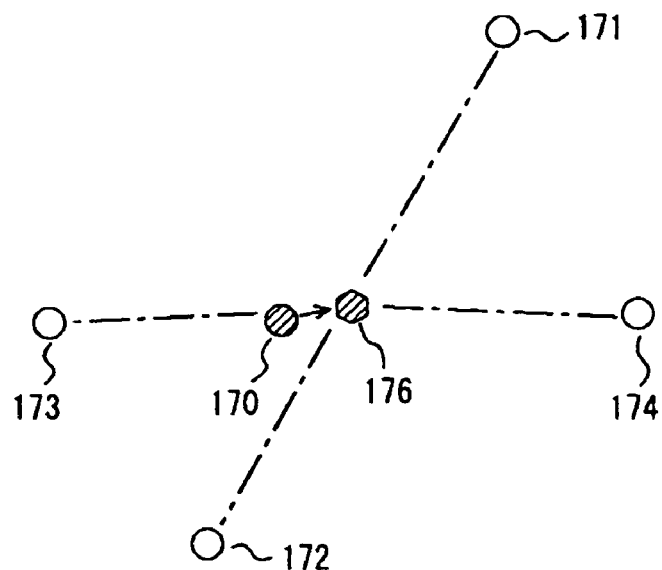
FIG. 17 is a diagram illustrating schematically smoothing in the example.

FIG. 17 illustrates smoothing of the stitches after approximate correction. The numeral 170 denotes an own stitch, the numeral 171 denotes a parent stitch, the numeral 172 denotes a child stitch, the numeral 173 denotes a right-hand adjacent stitch, and the numeral 174 denotes a left-hand adjacent stitch. The stitch 170 is displaced to the averaged position of the four neighboring stitches 171 to 174, up, down, right and left, the numeral 176 denoting the position relative to the four neighboring stitches up, down, right and left, after smoothing. Each stitch is repeatedly smoothed in the way described to yield a realistic image.

Figure 18:
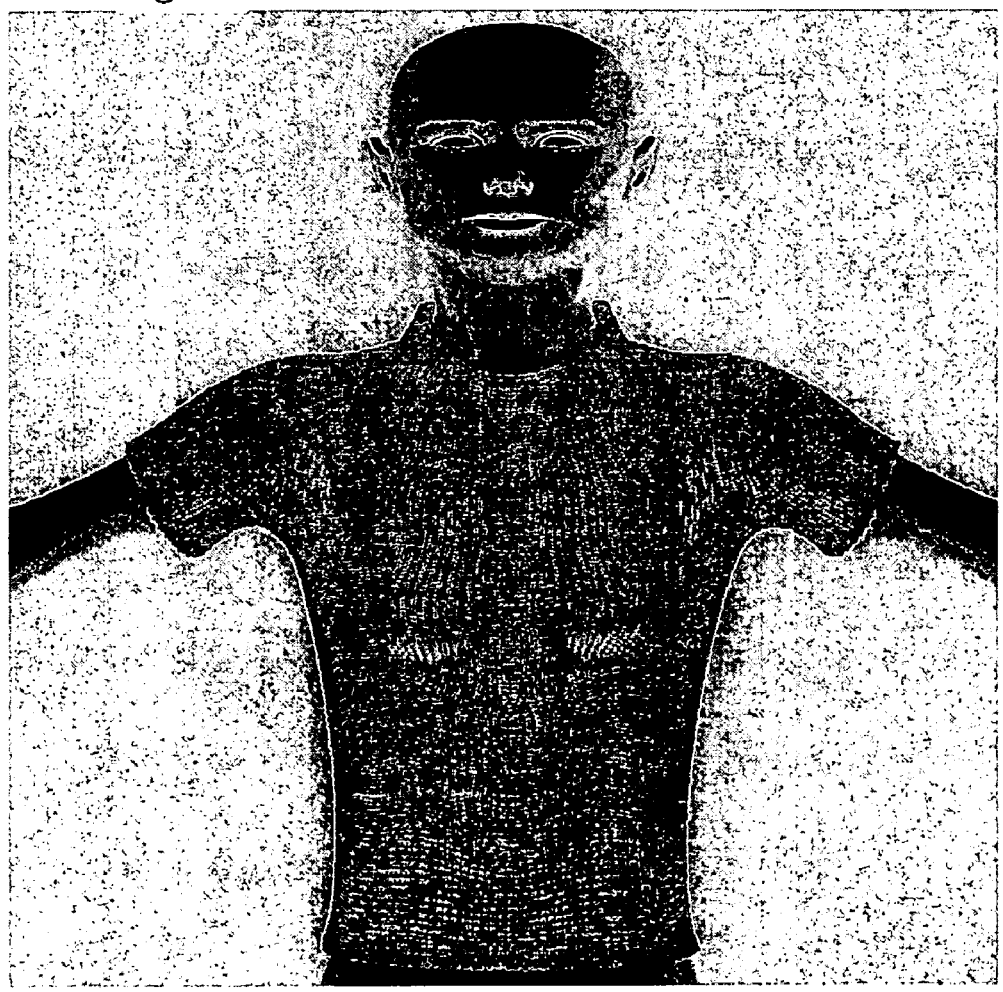
FIG. 18 is a diagram illustrating schematically a front view of the garment after smoothing in the example.
Figure 19:
FIG. 19 is a diagram illustrating schematically a side view of the garment after smoothing in the example.

FIG. 18 and FIG. 19 illustrate a simulated image of a knit garment after smoothing. In the example no calculations have been performed as regards own weight, stitch movement caused by stresses acting on the yarn, and so on. The model used, also, is a simple model in which a garment is deformed to a natural condition, is expanded, and is worn through shrinking towards the axes of a human model. An additional processing involves rearranging the stitches so as to even out the spacing between stitches. These processes use a simple model, devoid of artificial assumptions, to simulate wearing of a garment without unnatural hypotheses.

The example affords the following effects.

(1) A garment can be fitted to a human model following a straightforward model and a relatively simple computational procedure.

(2) Which axis a stitch is shrunk towards can be worked out by imparting a part name (region) attribute to each stitch.

(3) The sleeves can curve naturally toward the body by using boundary information between the parts.

(4) Mapping of the stitches to the polygons can be performed efficiently, without a round-robin scheme.

(5) The garment can be fitted to the human model to a realistic size by shrinking the garment from an expanded state.

(6) Through a relatively simple procedure, sleeves can be portrayed being supported unequally over and under the arms.

(7) Strain resulting from the movement of the stitches towards the three axes of the torso and both arms can be eliminated through approximate correction in the horizontal direction and/or the vertical direction.

(8) The stitches can be rearranged following a natural model through smoothing after approximate correction.

(9) The quality of the simulated image can be improved by rendering, by moving the stitches in the normal direction of the polygons in accordance with stitch type or the like, and by portraying in detail each stitch using a yarn model.

The example illustrates wearing of a sweater, but it may apply also to pants, slacks, dresses and the like. Slacks and pants, for instance, require only using three axes, the axis of the torso and both legs. In parts having turn-ups, such as a turtleneck or the like, the preliminary deformation step, for instance, may be performed repeatedly.

The invention claimed is:

1. A method for simulating wearing of a knit garment on a human model, the human model having a plurality of polygons on a surface of the human model and an axis, the method comprising the steps of:
    positioning a virtual knit garment tentatively with respect to the human model in such a way that the axis of the human model passes through an interior of the virtual knit garment;
    fitting the tentatively positioned virtual knit garment to the human model by expanding/shrinking the virtual knit garment toward the axis;
    associating each point of the virtual knit garment with the polygons of the human model, wherein a perpendicular line from said each point towards the axis is obtained, a polygon intersecting the perpendicular line is obtained, and said each point associates with the polygon; and
    initiating obtaining a polygon associated with a subsequent point from a polygon associated with a neighboring point which is already obtained.

2. A method for simulating wearing of the knit garment on the human model of claim 1, wherein:
    prior to said wearing, said virtual knit garment is three-dimensionally expanded beyond a natural size predicted based on at least number of stitches and stitch size; and
    subsequently, upon said wearing, a stitch outside the human model is shrunk and a stitch inside the human model is expanded.

3. A wearing simulation device, comprising:
    storing means for storing in 3D an axis of a human model, and a position and an orientation of a plurality of polygons provided on a surface of the human model;
    arranging means for tentatively arranging a virtual knit garment in a three-dimensional space, in such a way that said axis passes through an interior of the virtual knit garment; and
    wearing means for fitting the virtual knit garment to the human model by shrinking/expanding the virtual knit garment toward the axis for each stitch of the virtual knit garment, obtaining a perpendicular line from said each stitch towards a corresponding axis, associating a polygon intersecting the perpendicular line with said each stitch, initiating obtaining a polygon associated with a subsequent stitch from a polygon associated with a neighboring stitch which is already obtained, and associating each point of a part with a polygon intersecting a direction of the shrinking/expanding.

4. The wearing simulation device of claim 3, further comprising
    three-dimensional deformation means for, prior to said wearing, three-dimensionally expanding said virtual knit garment beyond a natural size predicted based on at least number of stitches and stitch size, wherein
    upon said wearing, a stitch outside the human model is shrunk and a stitch inside the human model is expanded with said wearing means.

5. A computer readable medium encoded with a wearing simulation program, comprising:
    storing command for storing in 3D an axis of a human model, and a position and an orientation of a plurality of polygons provided on a surface of the human model;
    arranging command for tentatively arranging a virtual knit garment in a three-dimensional space, in such a way that said axis passes through an interior of the virtual knit garment; and
    wearing command for fitting the virtual knit garment to the human model by shrinking/expanding the virtual knit garment toward the axis for each stitch of the virtual knit garment, obtaining a perpendicular line from said each stitch towards a corresponding axis, associating a polygon intersecting the perpendicular line with said each stitch, initiating obtaining a polygon associated with a subsequent stitch from a polygon associated with a neighboring stitch which is already obtained, and associating each point of a part with a polygon intersecting a direction of the shrinking/expanding.

6. The computer readable medium encoded with the wearing simulation program of claim 5, further comprising
    three-dimensional deformation command for, prior to said wearing, three-dimensionally expanding said virtual knit garment beyond a natural size predicted based on at least number of stitches and stitch size, wherein
    upon said wearing, a stitch outside the human model is shrunk and a stitch inside the human model is expanded with said wearing command.

* * * * *